(12) United States Patent
McClain et al.

(10) Patent No.: US 6,372,121 B1
(45) Date of Patent: Apr. 16, 2002

(54) REDUCING UNDESIRED POLYMERIZATION IN THE BASIC WASH UNIT OF HYDROCARBON CRACKING PROCESS

(75) Inventors: Robert D. McClain, Sugar Land; Natu R. Patel, Houston; Raymond M. Glath, Richmond, all of TX (US)

(73) Assignee: Nalco/Exxon Energy Chemicals, L.P., Sugar Land, TX (US)

( * ) Notice: Subject to any disclaimer, the term of this patent is extended or adjusted under 35 U.S.C. 154(b) by 0 days.

(21) Appl. No.: 09/703,108

(22) Filed: Oct. 31, 2000

(51) Int. Cl.[7] .................................................. C10G 9/16
(52) U.S. Cl. ................................ 208/48 AA; 208/48 R; 585/950
(58) Field of Search ......................... 208/48 AA, 48 R; 585/950

(56) References Cited

U.S. PATENT DOCUMENTS

| | | | |
|---|---|---|---|
| 3,364,130 A | * 1/1968 | Barnum et al. | 208/48 AA |
| 4,673,489 A | 6/1987 | Roling | 208/289 |
| 4,952,301 A | 8/1990 | Awbrey | 208/48 AA |
| 5,160,425 A | 11/1992 | Lewis | 208/95 |
| 5,194,143 A | 3/1993 | Roling | 208/291 |
| 5,220,104 A | 6/1993 | McDaniel et al. | 585/853 |
| 5,264,114 A | 11/1993 | Dunbar | 208/48 AA |
| 5,288,394 A | 2/1994 | Lewis et al. | 208/48 AA |
| 5,714,055 A | * 2/1998 | Lewis et al. | 208/48 R |
| 5,770,041 A | 6/1998 | Lewis et al. | 208/48 AA |
| 5,879,534 A | 3/1999 | Lewis et al. | 208/48 AA |

\* cited by examiner

*Primary Examiner*—Nadine Preisch
(74) *Attorney, Agent, or Firm*—Margaret M. Brumm; Thomas M. Breininger

(57) ABSTRACT

This invention is a method to inhibit the polymerization of carbonyl compounds in a basic wash unit operation in a hydrocarbon cracking process, wherein a compound selected from the group consisting of alpha-amino acids and esters thereof and amides thereof and salts thereof and mixtures thereof or Mercaptoacetic acid and alkyl esters thereof, is added either to a stream comprising a carbonyl compound or to the basic wash unit operation;

wherein the compound is selected such that it remains water-soluble and base-soluble and does not flocculate in the stream or in the basic wash unit operation; and wherein the stream is contacted with the compound either before or at the same time as the stream enters the basic wash unit operation; or wherein the compound is added to the basic wash unit operation before or while the stream enters the basic wash unit operation.

36 Claims, No Drawings

REDUCING UNDESIRED POLYMERIZATION IN THE BASIC WASH UNIT OF HYDROCARBON CRACKING PROCESS

FIELD OF THE INVENTION

This invention is in the field of cracking of hydrocarbons. Specifically this invention is in the field of reducing undesired polymerization of carbonyl compounds in unit operations of hydrocarbon cracking processes.

BACKGROUND OF THE INVENTION

Pyrolysis is the transformation of a compound into one or more other substances by heat alone. In the petroleum and petrochemical industries, pyrolysis is useful for the processing of hydrocarbons. This process is often referred to as "cracking". When the pyrolysis of hydrocarbons is conducted in the presence of steam, it is often referred to as "steam cracking". The steam cracking of ethane, propane, naphthas, gas oils and other hydrocarbon feedstocks is a useful process for producing valuable olefins. As a byproduct of the steam cracking process, oxygenated compounds, including carbonyl compounds, are formed. These carbonyl compounds include, but are not limited to, aldehydes and ketones. The amount of carbonyl compounds formed in cracking operations can vary widely, but is typically from about 1 ppm to about 200 ppm in the gas stream with concentrations as high as about 1000 ppm occasionally being encountered because of the use of various feedstocks and cracking temperatures.

Byproducts of hydrocarbon cracking processes include the undesirable acid gases $CO_2$ and $H_2S$. Therefore, it is normal for a hydrocarbon cracking plant to have an acid gas removal system to remove $CO_2$ and $H_2S$ from the cracked gas. Typically the acid gas removal system usually consists of passing the gas steam through a basic wash (pH greater than 7) to remove acidic components, including hydrogen sulfide and carbon dioxide gas. In the petroleum and petrochemical industries, unit operations involving basic washes are commonly carried out in equipment referred to as 'caustic scrubbers' or 'caustic towers'. As an alternative to a caustic tower, about 5% of all ethylene cracking plants use amine, instead of caustic, to remove acid gases. These units are often referred to as "amine scrubbers" or "amine towers".

In an acid gas removal system, some oxygenated compounds are also removed. It is known in the art of hydrocarbon processing that certain of these oxygenated compounds, especially carbonyl compounds and particularly acetaldehyde, will undergo polymerization in the presence of the base. In the acid gas removal system, the acetaldehyde polymer will settle on internal equipment surfaces leading to fouling and eventual plugging. Fouling and plugging of the internal equipment means the unit must be shut down to perform cleaning. Every time a unit operation has to be shut down for cleaning it means that a cost is incurred due to lost production, over and above, the actual cost to clean the equipment.

In addition to the caustic scrubbers and caustic towers where treatment is required to inhibit fouling caused by unwanted polymerization, there are other basic wash unit operations in hydrocarbon processing that also require treatment in order to prevent undesirable polymerization of carbonyl compounds. These other basic wash unit operations include, but are not limited to, amine systems to scrub acid gasses (using higher-boiling aminoalcohols such as, but not limited to, ethanolamine, diethanolamine and derivatives of amino alcohols such as, but not limited to methoxyethylamine), spent caustic oxidizers and benzene strippers. A spent caustic oxidizer converts sulfides into sulfates to allow caustic to be disposed of, or to be sold. A benzene stripper is a unit that uses hydrocarbon, often a high boiling mixture called "pyrolysis gasoline", taken from other units in the ethylene plant, to wash "spent caustic". "Spent caustic" is caustic that has been used in other unit operations, such as the caustic tower. The hydrocarbon "washes" residual benzene out of the spent caustic. The unit is called a benzene stripper because the benzene is stripped from the spent caustic.

Ten years ago the amount of undesired polymer that was formed in this way was usually insignificant. As hydrocarbon plants expanded their capacity, the amount of undesired polymer increased and the sheer volume of undesired polymer formed has now become a problem for more and more hydrocarbon plant operators.

Several materials are known and currently being used in the petroleum and petrochemical industries to mitigate carbonyl compound polymer caused fouling. These materials include dispersants, inhibitors, reducing agents and antioxidants.

U.S. Pat. No. 5,714,055 to Lewis et al. describes a method of inhibiting the formation of fouling deposits occurring on the surfaces of an alkaline scrubber used to wash acid gases generated during the manufacturing of olefins by using substituted aromatic amines selected from the group consisting of 2-aminophenol, 4-aminophenol, 4-aminobenzenesulfonic acid and salts thereof, 4-amino-o-cresol, 3-aminophenol, 2-aminobenzoic acid and salts thereof, 3-aminobenzoic acid and salts thereof, and 4-aminobenzoic acid and salts thereof.

U.S. Pat. No. 5,264,114 to Dunbar, describes and claims a method for inhibiting the formation and deposition of fouling materials during caustic washing of hydrocarbon gases contaminated with carbonyl compounds (one group of carbonyl compounds being aldehydes) which comprises: treating said hydrocarbon gases with an aqueous amine solution, wherein said aqueous amine solution comprises water and an amine compound having a concentration range of from about 2 ppm to about 5,000 ppm, and wherein the amine of said aqueous amine solution is selected from the group of organic compounds consisting of the formula $RNH_2$ and $R_2NH$ wherein R is selected from the group consisting of alkyl groups and aryl groups, before said caustic washing, to remove a significant amount of said carbonyl compounds and to thereby produce a treated hydrocarbon stream.

U.S. Pat. No. 5,194,143 to Roling describes and claims a method for inhibiting the formation of polymeric based fouling deposits during the basic washings of olefin-containing hydrocarbons contaminated with oxygenated compounds comprising adding to the wash about 1 to about 10,000 parts per million acetoacetate ester compound having the formula

wherein x is an integer from about 1 to about 8 and y is an integer from about 3 to about 17.

U.S. Pat. No. 4,952,301 to Awbrey describes and claims a method for inhibiting the formation of polymeric based fouling deposits which, in the absence of inhibition treatment, are formed during the basic washing of hydrocarbons contaminated with oxygen-containing compounds, said method comprising adding to the wash an inhibiting amount of an ethylenediamine compound of the formula NH$_2$(CH$_2$CH$_2$NH)$_x$H wherein x is an integer of from about 1 to about 10.

U.S. Pat. No. 4,673,489 to Roling describes and claims a method for inhibiting the formation and deposition of fouling materials during the basic washing of hydrocarbons contaminated with oxygenated compounds which comprises performing the wash of the hydrocarbon in the presence of a sufficient amount of hydroxylamine, of the formula NH$_2$OH or an acid salt or mixtures thereof, for inhibiting the formation and deposition of foulant.

U.S. Pat. No. 5,220,104 to McDaniel et al. describes and claims a method for inhibiting the formation and deposition of fouling materials during basic washing of hydrocarbons contaminated with oxygenated compounds which comprises performing the washing of the hydrocarbons in the presence of a solution comprising a percarbonate compound in an amount sufficient to inhibit the formation and deposition of fouling materials.

U.S. Pat. No. 5,160,425 to Lewis describes and claims a method of inhibiting formation of polymeric fouling deposits during the caustic scrubbing of pyrolytically produced hydrocarbons contaminated with oxygen containing compounds with a basic washing solution having a pH greater than 7 comprising adding to the basic washing solution a sufficient amount of carbohydrazide for inhibiting formation of polymeric fouling materials.

U.S. Pat. No. 5,288,394 to Lewis et al. describes and claims a method of inhibiting formation of polymeric fouling deposits after the caustic scrubbing of a hydrocarbon stream contaminated with oxygenated compounds with a basic washing solution having a pH greater than 7 comprising adding to said hydrocarbon stream a sufficient amount for inhibiting formation and deposition of fouling materials of a composition comprising at least one hydrazide compound.

U.S. Pat. No. 5,770,041 to Lewis et al. describes and claims a method of inhibiting the formation of fouling deposits occurring in an alkaline scrubber used to remove acid gases, which deposits are formed during the scrubbing of pyrolytically produced hydrocarbons contaminated with oxygen-containing compounds with a caustic solution having pH greater than 7 which comprises adding an effective deposition-inhibiting amount of a non-enolizable carbonyl compound to the caustic solution.

U.S. Pat. No. 5,879,534 to Lewis et al., describes and claims a method of inhibiting the formation of fouling deposits occurring in spent caustic wash systems used for ethylene dichloride manufacturing processes which are in contact with ethylene dichloride processing streams contaminated with oxygen-containing compounds, which deposits are formed in ethylene dichloride processing streams contaminated with oxygen-containing compounds while in contact with a caustic solution having a pH greater than 7, which comprises adding an effective deposit-inhibiting amount of a non-enolizable carbonyl compound to said caustic solution.

It is desirable to identify additional compounds to inhibit this undesirable polymerization of carbonyl compounds in hydrocarbon cracking processes.

SUMMARY OF THE INVENTION

The first aspect of the instant claimed invention is a method to inhibit the polymerization of a carbonyl compound in a basic wash unit operation in a hydrocarbon cracking process, comprising:
    contacting a stream comprising at least one carbonyl compound with a compound selected from the group consisting of
        alpha-amino acids and esters thereof and amides thereof and salts thereof and mixtures thereof;
    wherein said compound is selected such that it remains water-soluble and base-soluble and does not flocculate in said stream;
    wherein said stream is contacted with said compound either before or at the same time as said stream enters said basic wash unit operation.

The second aspect of the instant claimed invention is a method to inhibit the polymerization of a carbonyl compound in a basic wash unit operation in a hydrocarbon cracking process, comprising:
    adding a compound selected from the group consisting of alpha-amino acids and esters thereof and amides thereof and salts thereof and mixtures thereof to a basic wash unit operation; and
    providing a stream comprising a carbonyl compound to said basic wash unit operation;
    wherein said compound is selected such that it remains water-soluble and base-soluble and does not flocculate in said stream or said basic wash unit operation; and
    wherein said compound is added to said basic wash unit operation before or while said stream enters said basic wash unit operation.

The third aspect of the instant claimed invention is a method to inhibit the polymerization of a carbonyl compound in a basic wash unit operation in a hydrocarbon cracking process, comprising:
    contacting a stream comprising at least one carbonyl compound with a compound selected from the group consisting of
        Mercaptoacetic acid and alkyl esters thereof and salts thereof and mixtures thereof,
    wherein said compound is selected such that it remains water-soluble and base-soluble and does not flocculate in said stream;
    wherein said stream is contacted with said compound either before or at the same time as said stream enters said basic wash unit operation.

The fourth aspect of the instant claimed invention is a method to inhibit the polymerization of carbonyl compounds in a basic wash unit operation in a hydrocarbon cracking process, comprising:
    adding a compound selected from the group consisting of Mercaptoacetic acid and alkyl esters thereof and salts thereof and mixtures thereof to a basic wash unit operation; and
    providing a stream comprising a carbonyl compound to said basic wash unit operation;
    wherein said compound is selected such that it remains water-soluble and base-soluble and does not flocculate in said stream or said basic wash unit operation; and
    wherein said compound is added to said basic wash unit operation before or while said stream enters said basic wash unit operation.

DETAILED DESCRIPTION OF THE INVENTION

For purposes of this patent application, the following terms have the indicated meanings:
    "acetaldehyde" is CH$_3$CHO, and has a CAS Registry Number of 75-07-0. It is also known as acetic aldehyde, aldehyde, ethanal or ethyl aldehyde.
    "phenylacetaldehyde" is C$_6$H$_5$CH$_2$CHO, and has a CAS Registry Number of 122-78-1. It is also known as α-toluic aldehyde.

"Aldrich" refers to Aldrich Chemical Company, P.O. Box 2060, Milwaukee, Wis., 53201 U.S.A. telephone number (800) 558-9160, fax number (800) 962-9591.

"alkyl" refers to a fully saturated hydrocarbon radical of from one to 10 carbon atoms.

"amino acid" is an organic acid containing both a basic amino group {—$NH_2$} and an acidic carboxyl group {—COOH}.

"α-amino acid" refers to organic acid containing both a basic amino group {—$NH_2$} and an acidic carboxyl group {—COOH}, where the amino group {—$NH_2$} is attached to the carbon atom next to the acidic carboxyl group{—COOH}. Throughout the remainder of this patent application "α-amino acid" will be written as "alpha-amino acid".

"aryl" refers to a single aromatic ring radical of 6 carbon atoms or to two or three fused aromatic rings (radical) of from 10 to 13 carbon atoms.

"Bachem" refers to Bachem California, Inc., USA, 3132 Kashiwa Street, Torrance, Calif. 90505, telephone number (310) 539-4171.

"benzyl" refers to the —$CH_2$—$C_6H_5$ radical.

"Lancaster" refers to Lancaster Synthesis, Inc., P.O. Box 1000, Windham, N.H. 03087-9977, U.S.A., telephone number (800) 238-2324, fax number (603) 889-3326.

"Mercaptoacetic acid" is also known as 'thioglycolic acid', CAS Registry No. 68- 11- 1. The molecular formula for Mercaptoacetic acid is $HSCH_2COOH$. Mercaptoacetic acid can also be described as a moiety where the nitrogen of Glycine has been replaced by a sulfur atom.

"mmoles" refers to millimoles.

"radical" refers to a moiety that has one bond available for attachment to another moiety.

The carbonyl compounds that are known to polymerize in a basic wash unit operation present in a hydrocarbon cracking process, include, but are not limited to, aldehydes and ketones. Specific polymerizable moieties within these general categories include, but are not limited to, acetaldehyde and phenylacetaldehyde.

The first aspect of the instant claimed invention is a method to inhibit the polymerization of a carbonyl compound in a basic wash unit operation in a hydrocarbon cracking process, comprising:

contacting a stream comprising at least one carbonyl compound with a compound selected from the group consisting of
alpha-amino acids and esters thereof and amides thereof and salts thereof and mixtures thereof;
wherein said compound is selected such that it remains water-soluble and base-soluble and does not flocculate in said stream;
wherein said stream is contacted with said compound either before or at the same time as said stream enters said basic wash unit operation.

Basic wash unit operations in which this method can be used, include, but are not limited to, caustic scrubbers, caustic towers, amine acid gas scrubbers, benzene strippers and spent caustic oxidizers.

Alpha-amino acids are known to people of ordinary skill in the art of organic chemistry. They are available commercially or capable of being synthesized by people of ordinary skill in the art of organic chemistry.

Preferable alpha-amino acids suitable for use in the method of the instant claimed invention are selected from the group consisting of:

Alanine (also known as α-alanine; α-aminopropionic acid; and 2-aminopropanoic acid), Asparagine (also known as α-aminosuccinamic acid; (β-asparagine; althein; aspartamic acid; and aspartamide), Aspartic acid (also known as asparaginin acid; asparagic acid; and aminosuccinic acid), Cysteine (also known as α-amino-β-thiolpropinonic acid; and β-mercaptoalanine), Homocysteine (also known as 2-amino-4-mercaptobutyric acid), Glutamine (also known as 2-amino-4-carbamoylbutanoic acid), Glutamic Acid (also known as α-aminoglutaric acid; and 2-aminopentanedioic acid), Glycine (also known as aminoacetic acid), Histidine (also known as α-amino-β-imidazolepropionic acid), Isoleucine (also known as 2-amino-3-methylpentanoic acid; and Ile), Leucine (also known as α-amino-γ-methylvaleric acid; and α-aminoisocaproic acid), Methionine (also known as 2-amino-4-(methylthio) butyric acid), Phenylalanine (also known as α-amino-β-phenylpropionic acid), Serine (also known as β-hydroxyalanine; and α-α-β-hydroxypropionic acid), Threonine (also known as α-amino-β-hydroxybutyric acid), Tryptophan (also known as indole-α-aminopropionic acid; and 1-α-amino-3-indolepropionic acid), Tyrosine (also known as β-p-hydroxyphenylalanine; and α-amino-β-p-hydroxyphenylpropionic acid) and Valine (also known as α-aminoisovaleric acid);

and esters thereof and amides thereof and salts thereof and mixtures thereof.

Preferred alkyl esters of alpha-amino acids include, but are not limited to, the ethyl ester of Cysteine and the ethyl ester of Alanine.

Aryl esters of alpha-amino acids are known in the art of alpha-amino acids.

Preferred benzyl esters of alpha-amino acids include, but are not limited to,

Glycine benzyl ester hydrochloride (CAS Registry No. 1738-68-7),

Alanine benzyl ester hydrochloride (CAS Registry No. 5557-83-5), and

Serine benzyl ester hydrochloride (CAS Registry No. 1738-72-3).

Preferred amides of alpha-amino acids include, but are not limited to Glycinamide hydrochloride (CAS Registry Number 1668-10-6).

These alpha-amino acids and derivatives thereof are available commercially through Aldrich or Lancaster or Bachem or can by synthesized by persons of ordinary skill in the art of organic chemistry.

The more preferred alpha-amino acids suitable for use in the method of the instant claimed invention are selected from the group consisting of Glycine, Histidine, Alanine, Cysteine, the ethyl ester of Cysteine, the ethyl ester of Alanine and mixtures thereof and salts thereof.

The most preferred alpha-amino acids are Glycine and Cysteine and mixtures thereof and salts thereof.

Glycine is one of the most preferred alpha-amino acids because it has been found that when a Glycine-acetaldehyde oligomer or Glycine-aldol oligomer is formed, these materials act as dispersants for themselves and for any other foulants known to be present.

The amount of compound added to said stream comprising a carbonyl compound or to the basic wash unit operation is from about 0.01 ppm to about 10,000 ppm, preferably from about 0.1 ppm to about 1000 ppm, and most preferably from about 1 ppm to about 100 ppm.

The particular compound selected must be capable of remaining water-soluble and base-soluble throughout the stream and the basic wash unit operation. If the compound loses solubility and begins to flocculate another compound should be selected. Flocculation of the compound is undesirable because it prevents the alpha-amino acid from inhibiting the polymerization of carbonyl compounds.

Typically, the compound is formulated to be a mixture of an alpha-amino acid, a base and water. One such typical formulation is 25% Glycine, 20% NaOH (50% aq. sol'n) and 55% deionized water. The purpose of adding base to the formulation is to inhibit the growth of microorganisms in the alpha-amino acids.

The compound may be added to the stream comprising a carbonyl compound before the streams' entry into the basic wash unit operation. The compound may be added to the stream comprising a carbonyl compound at the same time the stream enters the basic wash unit operation.

In addition to the previously described methods of adding the compound to the stream, the compound may be added to the basic wash unit operation before or while the stream comprising a carbonyl compound enters the basic wash unit operation. The compound may be added to the basic wash unit operation by adding it to whatever base is being used in the basic wash unit operation.

It is preferred to add the compound directly to the basic wash unit operation, before the entry of the stream comprising a carbonyl compound.

These alpha-amino acids have been found to react with any carbonyl compounds present in said stream to yield stable, water-soluble derivatives that do not form polymer on exposure to base. Thus by adding alpha-amino acids to streams comprising carbonyl compounds or to basic wash unit operations in a hydrocarbon cracking process, the undesirable polymerization of the carbonyl compounds can be inhibited.

This invention has the added benefit that the alpha-amino acids suitable for use are considered a "green" chemistry that makes them highly desirable for field applications.

It has also been found possible to inhibit the undesirable polymerization of carbonyl compounds by adding a compound selected from the group consisting of Mercaptoacetic acid, alkyl esters thereof, salts thereof and mixtures thereof to either the stream comprising the carbonyl compound or to the basic wash unit operation itself. Mercaptoacetic acid and its alkyl esters and salts are available commercially, through Aldrich and other companies, or can be synthesized using techniques known in the art of organic chemistry.

The following examples are intended to be illustrative of the present invention and to teach one of ordinary skill how to practice and make use of the invention. These examples are not intended to limit the invention or its protection in any way.

EXAMPLES

Examples I, II, III and IV all have the alpha-amino acid added to the acetaldehyde before the acetaldehyde is contacted by base.

Example I

Testing of Cysteine and Homocysteine

Solutions (5% wt/wt, made by diluting 5 grams of alpha-amino acid with 95 grams of water) of Cysteine and Homocysteine were made in deionized water. Aliquots (5 mL, ~2 mmoles) of each solution were added to separate centrifuge tubes and 5 mL of deionized water was added to a third tube. The tubes were cooled to ~30° F.(−1° C.) in a brine/ice bath and 100 $\mu$L (1.8 mmoles) of acetaldehyde were added to each tube. The tubes were shaken and put back in the brine/ice bath. Before the addition of acetaldehyde, the pH of the solutions in the tubes was determined to be between about 4 and about 5 using pH paper. After 1.5 hours, the tubes were removed from the bath and 5 mL of 1 M potassium hydroxide were added to each tube. The tubes were shaken and allowed to warm to room temperature. The pH of the solution in each tube was checked with pH paper and found to be about 14. Observations were recorded after 100 minutes and the tubes containing alpha-amino acid were clear and colorless. The solution in the tube containing only caustic and deionized water had a yellow color. The yellow solution was indicative of the polymerization of the acetaldehyde under the caustic conditions present in the tube. The solutions in the tubes containing acetaldehyde and alpha-amino acid were not yellow because the alpha-amino acid inhibits the polymerization reaction.

Example II

Investigation of Cysteine, Glycine, Alanine, Cysteine ethyl ester and Alanine ethyl ester Solutions (5% wt/wt) of Cysteine ("Cys"), Glycine ("Gly"), Alanine ("Ala"), Cysteine ethyl ester hydrochloride salt ("Cys-OEt"), and Alanine ethyl ester hydrochloride salt ("Ala-OEt"), were made in deionized water. The pH of the Cysteine, Glycine, and Alanine solutions was found to be between about 4 and about 5 using pH paper. The pH of the other solutions was about 2, but was adjusted to be between about 4 and about 5 with triethylamine. Aliquots (5 mL) of each alpha-amino acid solution were added to separate centrifuge tubes and 5 mL of deionized water were added to a sixth tube. The tubes were cooled to ~30° F. (−1° C.) in a brine/ice bath and 100 $\mu$L (1.8 mmoles) of acetaldehyde were added to each tube. The tubes were shaken and put back in the brine/ice bath. After 2 hours, the tubes were removed from the bath and 5 mL of 1 M potassium hydroxide were added to each tube. The tubes were shaken and allowed to warm to room temperature. Observations were recorded after 2 hours and 66 hours and are summarized in Table Example II.

TABLE EXAMPLE II

| Tube with →: | No amino acid | 2.1 mmoles Cys | 2.8 mmoles Ala | 3.3 mmoles Gly | 1.5 mmoles Cys-OEt | 1.6 mmoles Ala-OEt |
|---|---|---|---|---|---|---|
| Condition after 2 h: | Intense yellow solution | Solution clear and colorless | Slightly tan colored solution | Solution clear and colorless | Solution clear and colorless | Slightly tan colored solution |
| Condition after 66 h: | Orange solution with ppt | Solution clear and colorless | Clear red solution | Clear red solution | Clear yellow solution | Clear red solution |

These results show that each of the alpha-amino acids and the alpha-amino acid esters inhibited the reaction of acetaldehyde to form polymeric precipitate (ppt) under basic conditions.

The slight yellow color in the Cys-OEt solution and the red color in the Gly, Ala, and Ala-OEt solutions after 66 hours arises from formation of aldol oligomers that remain in solution. Hence, these alpha-amino acids still do inhibit polymer formation but the polymerization reaction does occur to the extent that it colors the solutions.

The Cysteine appears to be most effective at inhibiting the polymerization reaction. The Cysteine appears to completely inhibit the formation of aldol polymer.

Example III
Investigation of Histidine and Mercaptoacetic Acid

A solution (5% wt/wt) of Histidine was made in deionized water. An aliquot (5 mL, 1.6 mmoles) was added to a centrifuge tube. Two others tubes were prepared by adding 5 mL of deionized water to both tubes. One of these tubes was also dosed with 140 μL (2.0 mmoles) of neat Mercaptoacetic Acid. The three tubes were cooled to ~30° F.(−1° C.) in a brine/ice bath and 100 μL (1.8 mmoles) of acetaldehyde were added to each. The tubes were shaken and put back in the brine/ice bath. After 1 hour, the tubes were removed from the bath and 5 mL of 1 M potassium hydroxide were added to each. The tubes were shaken and allowed to warm to room temperature. After sitting overnight, the solution in the blank tube was orange and a red-orange precipitate had settled to the bottom of the tube. The tube containing Mercaptoacetic Acid was clear and colorless. It remained so for 14 days. The solution containing Histidine turned orange-yellow but no solids formed. This result confirmed that Mercaptoacetic Acid and Histidine will inhibit the formation of foulant due to the polymerization of acetaldehyde under basic conditions.

Example IV
Testing of Glycinamide hydrochloride

A solution (5% wt/wt, made by diluting 4 grams of alpha-amino acid derivative with 76 grams of water) of glycinamide hydrochloride (available from Aldrich (catalog No. G610-4) and Bachem (Catalog No. E-1950)) was made in deionized water. A 5 mL aliquot (~2.26 mmoles) of the solution was added to each of three centrifuge tubes and 5 mL of deionized water was added to a fourth tube. The tubes were cooled to ~30° F.(−1° C.) in a brine/ice bath and 100 μL (1.8 mmoles) of acetaldehyde were added to the first tube and the fourth tube. To the second and third tubes was added 200 μL (3.6 mmoles) and 300 μL (5.4 mmoles) of acetaldehyde, respectively. The tubes were shaken and put back in the brine/ice bath. After 1 hour, the tubes were removed from the bath and 5 mL of 1M potassium hydroxide were added to each tube. The tubes were shaken and allowed to warm to room temperature. Observations were recorded after 120 minutes and the tubes containing glycinamide hydrochloride were clear and colorless. The solution in the tube containing only potassium hydroxide and deionized water had a yellow color. The yellow solution was indicative of the polymerization of the acetaldehyde under the caustic conditions present in the tube. The solutions in the tubes containing acetaldehyde and glycinamide hydrochloride were not yellow because the glycinamide hydrochloride inhibited the polymerization reaction.

After 21 hours, the tubes containing glycinamide hydrochloride remained clear and colorless. The solution in the tube containing only caustic and deionized water had a yellow-orange color and contained an orange precipitate.

The following standard test procedure was followed for Examples V, VI, VII and VIII To 10 ml of a 5% aqueous sodium hydroxide solution, the desired amount of alpha-amino acid was added and mixed well to give a clear solution in a 15 ml test tube or centrifuge tube with cap. To this solution a known amount of acetaldehyde, or vinyl acetate used as a source of acetaldehyde (when the vinyl acetate is added to the caustic, it hydrolyses to acetaldehyde), was added and shaken for approximately 2 minutes. The reaction solution was allowed to stand at ambient temperature for two hours and at 110° F. (43° C.) overnight in the hot house. The tubes were observed for the aldol polymer formation.

Example V
Testing the Use of Alanine as the Alpha-Amino Acid

Table Example V shows the results of evaluation of Alanine, obtained from Aldrich, using vinyl acetate as the source of acetaldehyde.

TABLE EXAMPLE V

| Example | Alanine | Vinyl Acetate | Results |
|---|---|---|---|
| Blank | none | 0.5 ml (0.005 mole) | Heavy Yellow ppts |
| 1 | 0.28 g (0.0031 mole) | 0.5 ml (0.005 mole) | Clear Red Solution |
| 2 | 0.14 g (0.0015 mole) | 0.5 ml (0.005 mole) | Red Soln + Traces of ppts |

Example VI
Testing the use of Glycine, obtained from Aldrich, as the Alpha-Amino Acid.

Table Example VI shows the results of evaluation of Glycine using vinyl acetate as the source of acetaldehyde.

The precipitates in tubes # 6, 7, and 8 were very little compared to blank and easily dispersed.

TABLE EXAMPLE VI

| Example Number | Glycine | Vinyl Acetate | Results |
| --- | --- | --- | --- |
| Blank | none | 0.46 ml (0.005 mole) | Heavy Yellow ppts |
| 1 | 0.375 g (0.005 mole) | 0.46 ml (0.005 mole) | Clear Red Soln |
| 2 | 0.187 g (0.0025 mole) | 0.46 ml (0.005 mole) | Clear Red Soln |
| 3 | 0.125 g (0.0017 mole) | 0.46 ml (0.005 mole) | Clear Red Soln |
| 4 | 0.094 g (0.00125 mole) | 0.46 ml (0.005 mole) | Hazy Red Soln |
| 5 | 0.075 g (0.001 mole) | 0.46 ml (0.005 mole) | Red Soln + Traces of ppts |
| 6 | 0.0625 g (00.00083 m) | 0.46 ml (0.005 mole) | Red Soln + Some ppts |
| 7 | 0.0533 g (0.00071 m) | 0.46 ml (0.005 mole) | Red Soln with ppts |
| 8 | 0.0375 g (0.0005 m) | 0.46 ml (0.005 mole) | Red Soln with ppts |

Note:
this example was repeated using acetaldehyde 0.028 ml (0.005 mole) instead of vinyl acetate, with the same amounts of Glycine as indicated in Table Example VI. This repeated experiment gave similar results.

Example VII
Evaluation of Bioprotein Fertilizer (Diamin RW),

Diamin RW is an aqueous solution of various alpha-amino acids (approximately 30%) with a pH of 5 and is available from B.F. Goodrich, Munich, Germany. The Diamin RW is a black liquid of 50% human hair hydrolysate. Because the hair is protein (polyamino acids) it is a rich source of alpha-amino acids. The human hair is boiled in acid or base to hydrolyze the protein, generating an amino acid soup. It typically contains from about 30% to 35% amino acids. The amino acid profile (g amino acid/100 g protein) is Lysine 4.3, Cysteine 1.3, Arginine 11.0, Aspartic acid 9.4, Phenylalanine 1.6, Threonine 8.1, Serine 13.4, Glutamic acid 20, Tyrosine 0.8, Histidine 1.5, Proline 9.6, Glycine 7.0, Alanine 5.3, Valine 4.3, Methionine 0.2, Iso-leucine 0.9 and Leucine 1.4.

Evaluation was carried out assuming Diamin RW contains 7% Glycine (The Diamin RW contains about 30% amino acid and 7% of this amino acid is Glycine.) using 10 ml of 5% aqueous sodium hydroxide solution. The results are shown in Table Example VII.

TABLE EXAMPLE VII

| Exp. # | Diamin RW | Acetaldehyde | Results |
| --- | --- | --- | --- |
| Blank | NONE | 0.28 ml (0.005 mole) | Heavy Yellow ppts. |
| 1 | 1.25 ml (~0.005 mole) | 0.28 ml (0.005 mole) | No ppts but Flocculants |
| 2 | 0.625 ml | 0.28 ml (0.005 mole) | No ppts but Flocculants |
| 3 | 0.417 ml | 0.28 ml (0.005 mole) | No ppts but Flocculants |
| 4 | 0.310 ml | 0.28 ml (0.005 mole) | No ppts but Flocculants |
| 5 | 0.25 ml | 0.28 ml (0.005 mole) | Traces of ppts/Flocculant |
| 6 | 0.208 ml | 0.28 ml (0.005 mole) | Some ppts/Flocculants |
| 7 | 0.178 ml | 0.28 ml (0.005 mole) | Some ppts/Flocculants |
| 8 | 0.125 ml | 0.28 ml (0.005 mole) | Ppts/Flocculants |

It appeared that Diamin RW worked as effectively as Glycine but Arginine and Lysine, 13% of total amino acids in Diamin RW, flocculated in aqueous alkali. These two-amino acids would not be suitable for systems with a pH of 10 or higher. The amount of flocculants decreased as the concentration of Diamin RW decreased in tubes 1 to 8.

Addition of 1.25 ml of Diamin RW to 10 ml of 5% aqueous sodium hydroxide solution gave approximately the same amount of flocculants as in tube 1.

Example VIII
Comparative Study of the Polymerization Inhibition of Glycine vs. Sodium Sulfanilate.

Table Example VIII shows the results of comparative evaluation of Glycine and sodium sulfanilate. In this experiment, the molar ratio of acetaldehyde to inhibitors was 10 to 1 in order to measure the amount of precipitates formed in the centrifuge tubes. The tubes were slowly rotated to mix the contents, after storing overnight at 110° F. (43° C.) to collect the precipitates at the bottom from the sides, and the tubes were allowed to stand for a second day to settle the dispersed precipitates for measurement.

TABLE EXAMPLE VIII

| Exp. # | Polymerization Inhibitor | Acetaldehyde | Volume of ppts. |
| --- | --- | --- | --- |
| Blank | NONE | 0.28 ml (0.005 mole) | 0.5 ml |
| 1 | 37.5 mg Glycine (0.0005) mole | 0.28 ml (0.005 mole) | 0.1 ml |
| 2 (comparative example, not an example of the claimed invention) | 97.5 mg sodium sulfanilate (0.0005) mole | 0.28 ml (0.005 mole) | 0.25 ml |

The precipitates in tube 1 were easily dispersed and took a long time to settle.

It should be noted that a smaller mass of Glycine is required to treat the acetaldehyde at the same molar ratio of sodium sulfanilate. This is because the molecular weight of the Glycine is smaller, i.e. more moles of Glycine is obtained from fewer grams.

Changes can be made in the composition, operation and arrangement of the method of the present invention described herein without departing from the concept and scope of the invention as defined in the following claims:

What is claimed is:

1. A method to inhibit the polymerization of a carbonyl compound in a basic wash unit operation in a hydrocarbon cracking process, comprising:

contacting a stream comprising at least one carbonyl compound with a compound selected from the group consisting of
alpha-amino acids and esters thereof and amides thereof and salts thereof and mixtures thereof,
wherein said compound is selected such that it remains water-soluble and base-soluble and does not flocculate in said stream;
wherein said stream is contacted with said compound either before or at the same time as said stream enters said basic wash unit operation.

2. A method to inhibit the polymerization of a carbonyl compound in a basic wash unit operation in a hydrocarbon cracking process, comprising:

adding a compound selected from the group consisting of alpha-amino acids and esters thereof and amides thereof and salts thereof and mixtures thereof to a basic wash unit operation; and providing a stream comprising a carbonyl compound to said basic wash unit operation;

wherein said compound is selected such that it remains water-soluble and base-soluble and does not flocculate in said stream or said basic wash unit operation; and wherein said compound is added to said basic wash unit operation before or while said stream enters said basic wash unit operation.

3. A method to inhibit the polymerization of a carbonyl compound in a basic wash unit operation in a hydrocarbon cracking process, comprising:

contacting a stream comprising at least one carbonyl compound with a compound selected from the group consisting of Mercaptoacetic acid and alkyl esters thereof and salts thereof and mixtures thereof, wherein said compound is selected such that it remains water-soluble and base-soluble and does not flocculate in said stream;

wherein said stream is contacted with said compound either before or at the same time as said stream enters said basic wash unit operation.

4. A method to inhibit the polymerization of carbonyl compounds in a basic wash unit operation in a hydrocarbon cracking process, comprising:

adding a compound selected from the group consisting of Mercaptoacetic acid and alkyl esters thereof and salts thereof and mixtures thereof to a basic wash unit operation; and providing a stream comprising a carbonyl compound to said basic wash unit operation;

wherein said compound is selected such that it remains water-soluble and base-soluble and does not flocculate in said stream or said basic wash unit operation; and wherein said compound is added to said basic wash unit operation before or while said stream enters said basic wash unit operation.

5. The method of claim 1 in which said compound is selected from the group consisting of Alanine, Asparagine, Aspartamic Acid, Aspartic Acid, Cysteine, Homocysteine, Glutamine, Glutamic Acid, Glycine, Histidine, Isoleucine, Leucine, Methionine, Phenylalanine, Serine, Threonine, Tryptophan, Tyrosine, Valine and esters thereof and amides thereof and salts thereof and mixtures thereof.

6. The method of claim 1 in which said compound is selected from the group consisting of Glycine, Histidine, Alanine, Cysteine, ethyl ester of Cysteine and ethyl ester of Alanine and salts thereof and mixtures thereof.

7. The method of claim 6 in which said compound is either Glycine or Cysteine or a mixture thereof.

8. The method of claim 7 in which said compound is Cysteine.

9. The method of claim 7 in which said compound is Glycine.

10. The method of claim 2 in which said compound is selected from the group consisting of Alanine, Asparagine, Aspartamic Acid, Aspartic Acid, Cysteine, Homocysteine, Glutamine, Glutamic Acid, Glycine, Histidine, Isoleucine, Leucine, Methionine, Phenylalanine, Serine, Threonine, Tryptophan, Tyrosine, Valine and esters thereof and amides thereof and salts thereof and mixtures thereof.

11. The method of claim 2 in which said compound is selected from the group consisting of Glycine, Histidine, Alanine, Cysteine, ethyl ester of Cysteine and ethyl ester of Alanine and salts thereof and mixtures thereof.

12. The method of claim 11 in which said compound is either Glycine or Cysteine or a salt thereof o r a mixture thereof.

13. The method of claim 12 in which said compound is Cysteine.

14. The method of claim 12 in which said compound is Glycine.

15. The method of claim 3 in which said compound is Mercaptoacetic acid.

16. The method of claim 4 in which said compound is Mercaptoacetic Acid.

17. The method of claim 1 in which said compound is added to said stream before said stream is contacted with base in said basic wash unit operation.

18. The method of claim 1 in which said compound is added to said stream at the same time as said stream is contacted with base in said basic wash unit operation.

19. The method of claim 3 in which said compound is added to said stream before said stream is contacted with base in a basic wash unit operation.

20. The method of claim 3 in which said compound is added to said stream at the same time as said stream is contacted with base in said basic wash unit operation.

21. The method of claim 1 in which said basic wash unit operation is a caustic scrubber or caustic tower.

22. The method of claim 1 in which said basic wash unit operation is an amine acid gas scrubber.

23. The method of claim 1 in which said basic wash unit operation is a spent caustic oxidizer.

24. The method of claim 1 in which said basic wash unit operation is a benzene stripper.

25. The method of claim 2 in which said basic wash unit operation is a caustic scrubber or caustic tower.

26. The method of claim 2 in which said basic wash unit operation is an amine acid gas scrubber.

27. The method of claim 2 in which said basic wash unit operation is a benzene stripper.

28. The method of claim 2 in which said basic wash unit operation is a spent caustic oxidizer.

29. The method of claim 3 in which said basic wash unit operation is a caustic scrubber or caustic tower.

30. The method of claim 3 in which said basic wash unit operation is an amine acid gas scrubber.

31. The method of claim 3 in which said basic wash unit operation is a benzene stripper.

32. The method of claim 3 in which said basic wash unit operation is a spent caustic oxidizer.

33. The method of claim 4 in which said basic wash unit operation is a caustic scrubber or caustic tower.

34. The method of claim 4 in which said basic wash unit operation is an amine acid gas scrubber.

35. The method of claim 4 in which said basic wash unit operation is a benzene stripper.

36. The method of claim 4 in which said basic wash unit operation is a spent caustic oxidizer.

* * * * *

UNITED STATES PATENT AND TRADEMARK OFFICE
CERTIFICATE OF CORRECTION

PATENT NO. : 6,372,121 B1
DATED : April 16, 2002
INVENTOR(S) : Robert D. McClain, Natu R. Patel and Raymond M. Glath It is certified that error appears in the above-identified patent and that said Letters Patent is hereby corrected as shown below:

<u>Title page,</u>
Item [54], Title, should read as:
-- REDUCING UNDESIRED POLYMERIZATION IN HYDROCARBON CRACKING PROCESSES --

Signed and Sealed this

Twenty-fourth Day of December, 2002

JAMES E. ROGAN
*Director of the United States Patent and Trademark Office*